July 17, 1923.

T. I. PHELPS 1,462,123

PEANUT PICKER

Filed April 27, 1920      3 Sheets-Sheet 1

WITNESSES
Guy M. Spring
V. B. Hillyard

INVENTOR.
THEOPHILUS I. PHELPS
BY
Richard B. Owen
ATTORNEY.

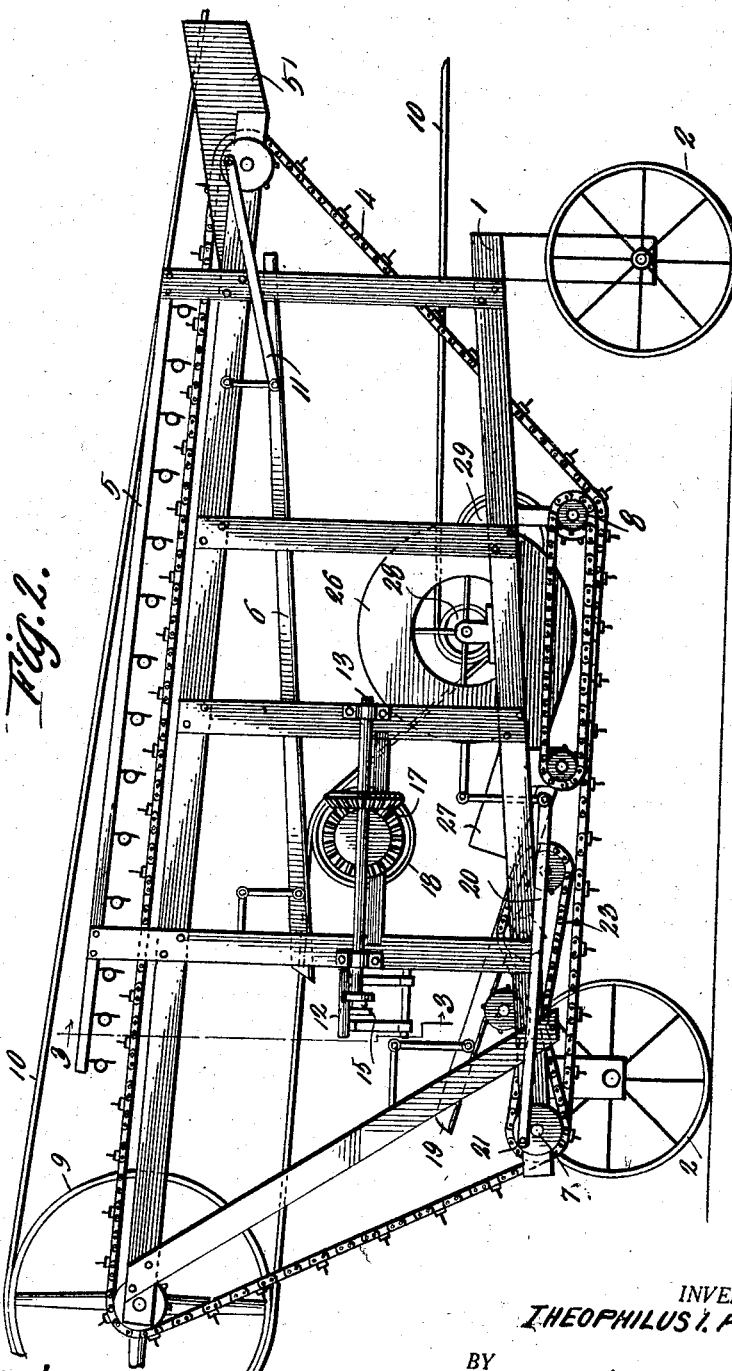

July 17, 1923.

T. I. PHELPS

PEANUT PICKER

Filed April 27, 1920      3 Sheets-Sheet 3

1,462,123

WITNESSES
Guy M. Spring
V. B. Hillyard

THEOPHILUS I. PHELPS INVENTOR.

BY
Richard B. Owen
ATTORNEY.

Patented July 17, 1923.

1,462,123

UNITED STATES PATENT OFFICE.

THEOPHILUS I. PHELPS, OF WOODVILLE, NORTH CAROLINA.

PEANUT PICKER.

Application filed April 27, 1920. Serial No. 377,080.

*To all whom it may concern:*

Be it known that I, THEOPHILUS I. PHELPS, a citizen of the United States, residing at Woodville, in the county of Bertie and State of North Carolina, have invented certain new and useful Improvements in Peanut Pickers, of which the following is a specification.

The present invention relates to mechanism for separating peanuts from the vines, removing the stems and carrying off chaff and other matter to be disposed of and is designed chiefly as an improvement on the machine disclosed in Patent No. 1,308,295, granted me January 20th, 1920.

The invention aims to simplify the construction, reduce the number of working parts and render the machine as a whole more efficient and less liable to derangement because of the reduced number of parts and compact structure.

The drawings illustrate a preferred embodiment of the invention. However, it is to be understood that in adapting the same to meet different conditions, various changes in the form, proportion, and minor details of construction may be resorted to without departing from the nature of the invention as claimed hereinafter.

Referring to the drawings hereto attached:—

Fig. 2 is a view similar to Fig. 1 of the reverse side of the machine.

Corresponding and like parts are referred to in the following description and indicated in the several views of the drawings by like reference characters.

Figure 1:
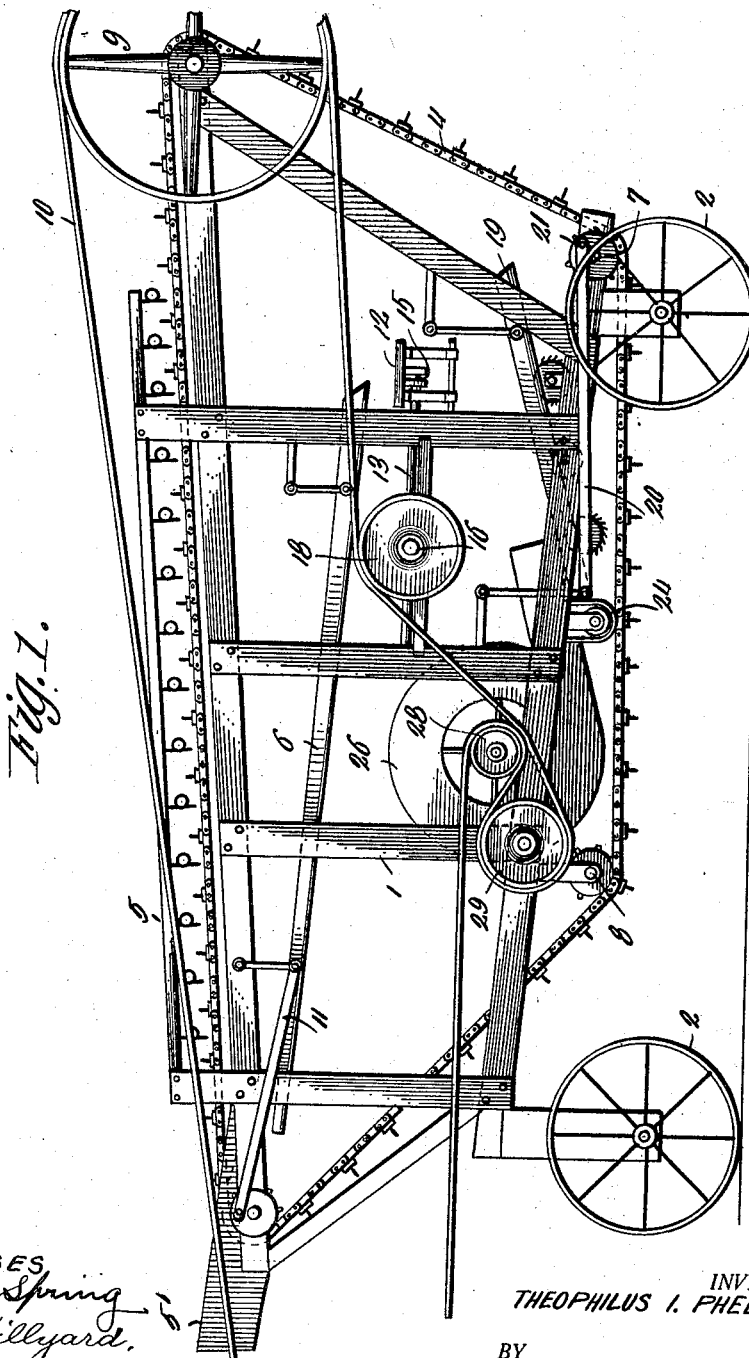
Fig. 1 is a side elevation of a peanut picking machine embodying the invention.
Figure 5:
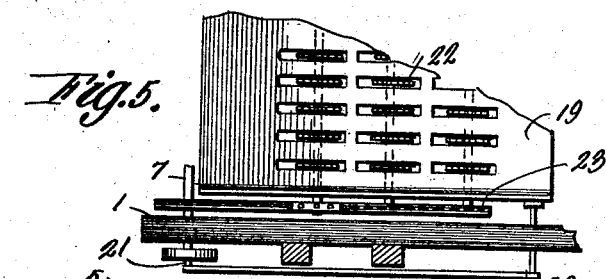
Figure 5 is a fragmentary plan of the stemming mechanism.
Figure 3:
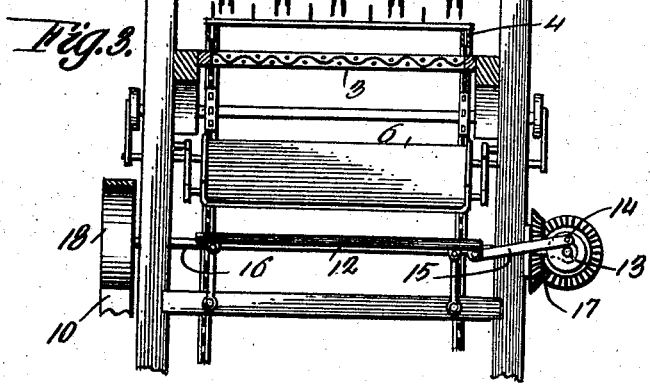
Fig. 3 is a sectional detail on the line 3—3 of Fig. 2 looking in the direction of the arrows.
Figure 4:
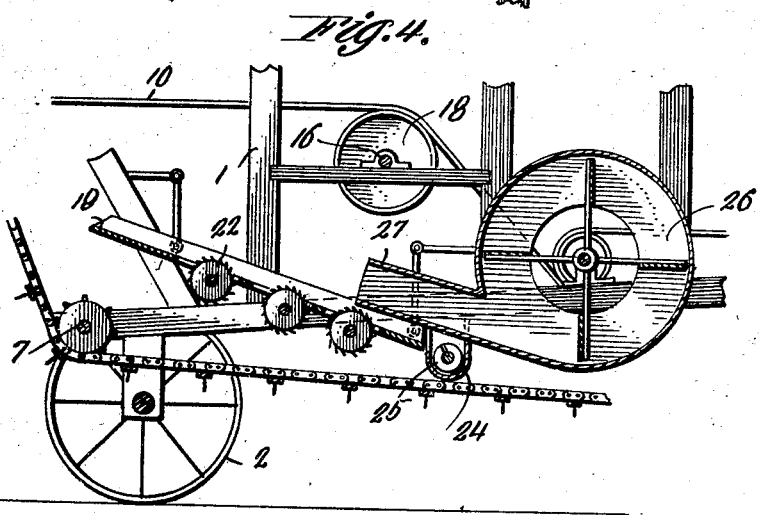
Fig. 4 is a sectional detail showing more clearly the stemming mechanism and the fan blower for carrying off chaff and like matter.

The machine embodies a suitable frame work 1, which is mounted upon wheels 2 for convenience of transportation. The framework 1 may be of any construction and design best adapted to support the working parts. The picking mechanism is disposed at the top of the machine and comprises a table 3, an endless conveyor 4 and a breast 5. The picker table 3 comprises a suitable frame and screen as indicated most clearly in Fig. 3 and is disposed beneath and adjacent the upper run of the endless conveyor 4. The vines are directed to the picker table by means of a chute 5' which is preferably located at the lower end of the picker table, the latter being preferably inclined to the horizontal. The breast 5 is disposed above the upper run of the endless conveyor and comprises a suitable frame and picker teeth. The upper run of the endless conveyor 4 is disposed between the breast 5 and the picker table 3. The endless conveyor 4 may be of any suitable construction and embodies a plurality of picker teeth which cooperate with the picker teeth of the breast so as to detach the peanuts from the vines. The detached peanuts pass through the meshes or openings of the screen portion of the picker table 3 and are received in a pan 6, which is disposed beneath the picker table and inclines in a reverse direction thereto. The picker table is relatively fixed, whereas the pan 6 is mounted to receive a vibratory movement to cause the peanuts to move thereover to the lower end. A shaft 7 is located at the rear end of the frame 1 and is provided with spur wheels to receive the endless chain of the conveyor 4. A shaft 8 is located near the lower forward end of the frame 1 and is provided with spur wheels around which pass the chains comprising the endless conveyor 4. As shown most clearly in Figs. 1 and 2 the endless conveyor 4 comprises upper, lower, front and rear runs, the upper and lower runs being approximately parallel, whereas the front and rear runs are upwardly divergent from the shafts 7 and 8. Movement may be imparted to any one of the shafts provided with spur wheels which engage the chains of the endless conveyor 4. As shown in the drawings, a band pulley 9 is secured to one end of the upper rear shaft and a drive belt 10 passes therearound and imparts motion thereto, said drive belt deriving power from a suitable source, not shown.

The pan 6 is mounted to have a vibratory movement imparted thereto. As shown a pitman 11, connects the pan with a wrist pin rotatable with the shaft at the upper forward end of the frame provided with the spur wheels around which the upper forward portion of the endless conveyor passes. The pan 6 receives the peanuts from the picker mechanism and delivers them to a shaking table 12, which is located below the delivery end of the pan 6. The shaking table 12 is disposed horizontally and is mounted so as to maintain a position parallel to a given position at all stages of its movement. A longitudinal shaft 13 located at one side of the machine is provided with a crank pin 14, which is connected by means of a pitman 15 with the shaking table 12 so as to impart a vibratory movement thereto. The shaft 13 is suitably geared to a transverse shaft 16 by means of bevel gearing 17. The opposite end of the transverse shaft 16 is provided with a band pulley 18 around which the drive belt 10 passes.

The stemming mechanism is located below the shaking table 12 and comprises a pan 19 which is mounted in such a manner as to admit of a vibratory movement being imparted thereto. A pitman 20 connects the pan 19 with a crank pin 21 rotatable with the shaft 7. A plurality of saws 22 cooperate with the pan 19 and are mounted thereon and operate through slots formed therein. The saws project above the plate 19 a distance to engage with the stems of the peanuts and effect separation thereof. The series of saws are driven in any convenient way and, as shown most clearly in Fig. 2, a drive chain 23 engages sprocket wheels provided at one end of the saw arbors and also engages a sprocket wheel secured to an end of the shaft 7. The pan 19 inclines in an opposite direction to the pan 6 and delivers the peanuts into a transversely arranged trough 24 which discharges the peanuts at one side of the machine into a suitable receptacle provided for their reception. A screw conveyor 25 operates in the trough 24 to effect a positive discharge of the peanuts therefrom. The shaft of the screw conveyor 25 is provided at one end with a spur wheel which receives the drive chain 23. This is shown most clearly in Fig. 2.

A fan blower 26 of any approved construction is located upon the frame 1 and its spout 27 overhangs the delivery portion of the pan 19 and is inclined so as to deliver a blast of air over the pan 19 and between it and the table 12, whereby to carry off chaff and other light objectionable matter. The fan shaft is provided at one end with a pulley 28, around which the drive belt 10 passes. An idle pulley 29 is disposed adjacent the pulley 28 and gives direction to the drive belt 10 which passes therearound, as indicated most clearly in Fig. 1.

The vines, as gathered from the field with the peanuts attached thereto, are fed to the machine in any desired way and are directed to the picker table 3 by means of the chute 5. The nuts are detached from the vines by means of the picker teeth carried by the breast 5 and endless conveyor 4. The vines are discharged at the rear of the machine from the upper run of the endless conveyor 4. The peanuts detached from the vines pass through the screen of the picker table 3 and drop into the pan 6, and are directed thereby to the shaking table 12, which agitates the peanuts so as to detach any earth or other matter that may tend to cling thereto. The peanuts drop from the shaking table 12 and are received upon the pan 19 of the stemming mechanism and the stems are removed by the rotary cutters or saws 22, in a manner well understood. The peanuts in their descent from the shaking table are subjected to the blast of air discharging from the spout 27 of the fan blower. This blast of air carries off chaff and light particles. The stems separated from the peanuts are likewise carried off by the blast of air and the peanuts are discharged from the pan 19 into the trough 24 and are finally delivered at the side of the machine into a suitably located receptacle arranged for their reception.

Having thus fully described my invention, what I claim as new and desire to secure by Letters Patent is:—

1. A peanut cleaning machine comprising a conveyor having upper, lower, front and rear runs, shafts and sprockets for the corners of the conveyor, means cooperating with the upper run of the conveyor to provide a picking mechanism, a vibrating table disposed below the picker mechanism to receive peanuts therefrom, a pitman connecting said vibrating table to one of said sprockets, a driven shaft arranged transversely of the machine beneath the delivery end of said vibrating table, a shaft disposed longitudinally of the machine in close proximity to aforesaid shaft, means for transmitting movement from the first to the second named shaft, a second vibrating table arranged below the delivery end of said first named vibrating table and driven by said last named shaft, a stemming mechanism arranged beneath said second named vibrating table and including rotary saws, a plurality of sprocket wheels, a plurality of sprocket wheels for driving the saws, and a sprocket chain engaging all of said sprocket wheels.

2. A peanut cleaning machine comprising a conveyor having upper, lower, front and rear runs, shafts and sprockets for the corners of the conveyor, means cooperating with the upper run of the conveyor to provide a picking mechanism, a vibrating table disposed below the picking mechanism, a reciprocating stemming mechanism arranged beneath the vibrating table, and a pitman connected to each vibrating and recpirocating mehanism, said pitman being connected to diagonally disposed sprockets of said conveyor.

3. A peanut cleaning mechanism comprising a conveyor, means cooperating with a run thereof and constituting a picking mechanism, means for driving the conveyor, a vibrating table situated beneath the picking mechanism and inclined downwardly toward one end of the machine, a second vibrating table arranged below the delivery end of the first named vibrating table, a shaft driven from said means for driving the conveyor, a gear carried by said shaft, a second gear meshing with the first named gear, and a pitman connected to said second named gear and to the second named vibrating table for operating the latter.

In testimony whereof I affix my signature in presence of two witnesses.

THEOPHILUS I. PHELPS.

Witnesses.
L. W. THOMPSON,
W. D. GARRIS.